UNITED STATES PATENT OFFICE.

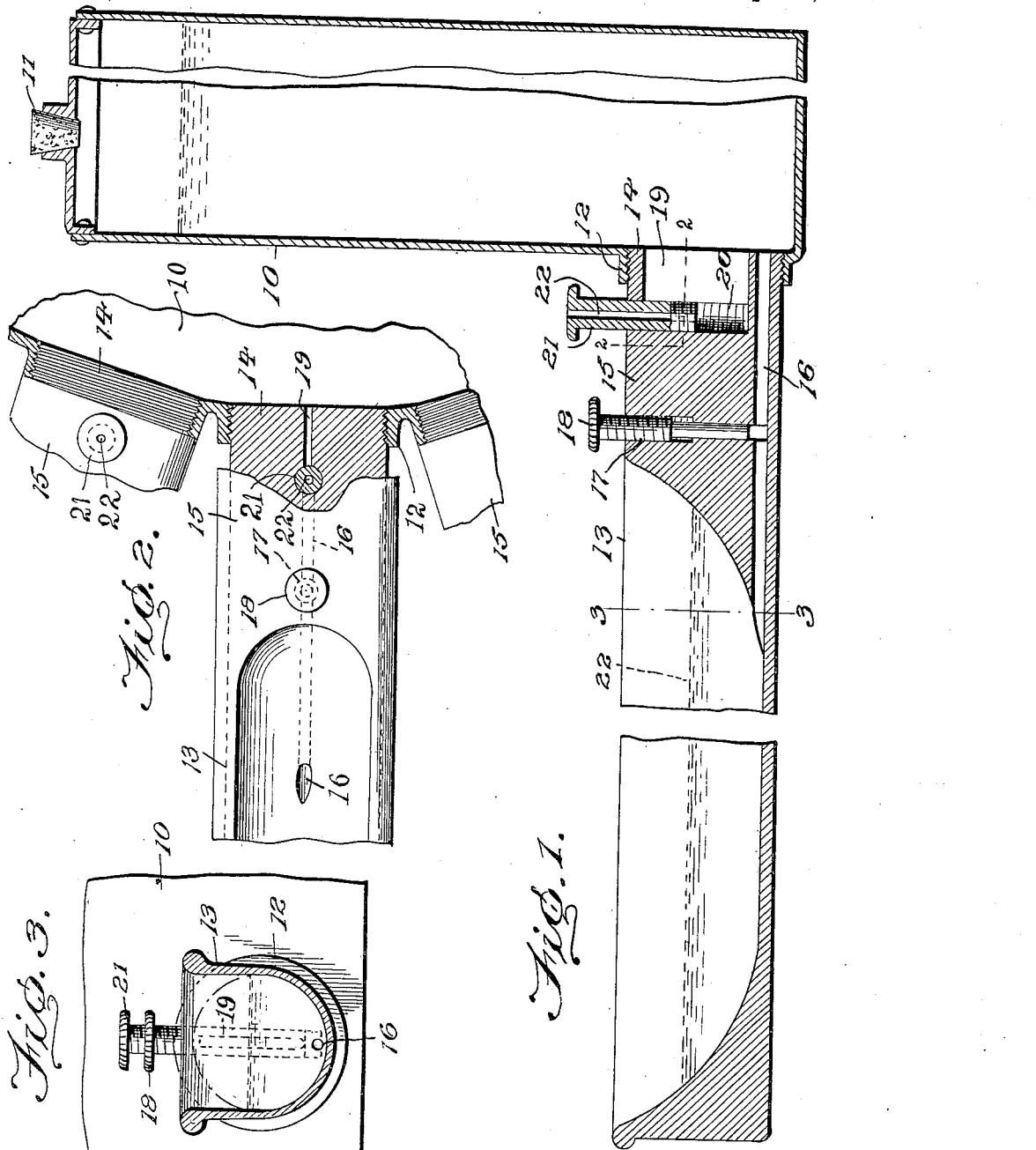

ALLAN SMITH, OF BERKELEY, CALIFORNIA.

AUTOMATIC WATERING-FOUNTAIN.

1,094,755.   Specification of Letters Patent.   Patented Apr. 28, 1914.

Application filed April 18, 1913.   Serial No. 762,150.

*To all whom it may concern:*

Be it known that I, ALLAN SMITH, a citizen of the United States, residing at Berkeley, in the county of Alameda and State of California, have invented certain new and useful Improvements in Automatic Watering-Fountains, of which the following is a specification.

This invention relates to poultry fountains and like devices wherein provision is made for maintaining a predetermined or uniform depth of liquid in a trough or other receiver which is connected to a tank or reservoir, and has for one of its objects to improve the construction and increase the efficiency and utility of devices of this character.

Another object of the invention is to provide a simply constructed device whereby the depth of the fluid may be controlled and its depth changed as required.

Another object of the invention is to provide a simply constructed device which may be inexpensively manufactured of any required size and of any suitable material to enable water or other fluid to be employed with economy and preserved from deterioration.

With these and other objects in view the invention consists in certain novel features of construction as hereinafter shown and described and then specifically pointed out in the claims, and in the drawings illustrative of the preferred embodiment of the invention, Figure 1 is a sectional elevation of the improved device. Fig. 2 is a plan view of the trough portion with the tank in section on the line 2—2 of Fig. 1. Fig. 3 is a transverse section of the trough portion on the line 3—3 of Fig. 1.

Corresponding and like parts are referred to in the following description and indicated in all the views of the drawings by the same reference characters.

The improved device may be employed for maintaining a predetermined depth of water or other liquid in a receiver which is connected to a supply reservoir or tank, such as some forms of evaporating apparatus, stock and poultry watering devices, and the like, and it is not desired to limit the invention for use in connection with any specific form of apparatus.

The improved device is more particularly applicable for use in connection with automatic watering fountains for fowls, stock, and the like, and for the purpose of illustration is shown adapted for use as a poultry fountain.

The improved device comprises a tank represented as a whole at 10 and of any suitable capacity and of any suitable material. The tank is provided with a plug valve 11 in the upper side through which the tank may be filled, and closed tightly when the device is in use. Extending from the tank at one side at the bottom is an internally threaded boss 12 in which the feed trough, represented as a whole at 13, is arranged to be supported by an externally threaded portion 14, the two parts 10—13 being thus firmly held together while at the same time readily separable when required.

The trough 13 is preferably formed of metal and U-shaped transversely and with a solid portion 15 next to the threaded portion 14. At its terminal the trough 10 is curved or sloping internally, as shown in Fig. 1, to facilitate the cleansing of the trough. A relatively small feed opening or conduit 16 is formed through the head 15 and communicates with the interior of the tank through the threaded portion 14. The solid head portion 15 is also provided with a vertical bore or opening 17 which communicates with the feed conduit 16 and is provided with a relatively long threaded plug 18 which operates to shut off the conduit temporarily while the tank is being filled. Formed in the inner end of the solid head 15 is a vertical slot or passage 19 with which a vertical threaded bore 20 communicates. Engaging in the bore 20 is a threaded plug 21 having a longitudinal orifice 22 extending entirely therethrough, the orifice thus communicating with the interior of the tank through the slot 19. By adjusting the stud 21 vertically the depth of water in the trough is controlled, as hereafter more fully explained.

The trough 13 is the feeding or watering trough portion of the improved device and will hold a sufficient supply of water to feed a certain predetermined number of fowls or animals for a certain predetermined length of time. The tank 10 may be of any required capacity depending upon the number of fowls or animals to be watered. When the tank is to be supplied with water the stud 18 is rotated until its lower end cuts off the flow through the conduit 16, and the stud 21 rotated until its lower end engages against the bottom of the bore 20 and thus closes the orifice 22. The plug or valve 11 is then removed and the water or other liquid poured in through the opening previously occupied by the latter plug. When this is accomplished the plug 11 is inserted which shuts off the flow of air from above, and the stud 18 then turned backward until the conduit 16 is open. The stud 21 is then turned backward until the lower end is level with the desired height of liquid in the trough, when the liquid will flow through the conduit 16 into the trough and rise therein to a point even with the bottom of the stud 21, and there constantly remain. As the liquid is consumed from the trough and the level thereby lowered, a sufficient quantity will automatically flow from the tank to replace the water thus consumed and maintain the water uniformly at the level indicated.

If it is desired to change the level of the liquid in the trough, the stud 21 is rotated to the right or left, as the case may be, to elevate or depress the lower end of the stud, or the lower end of the orifice 22, as before described. A plurality of the troughs may be connected to one tank by supplying a plurality of the "bosses" 12, as indicated in Fig. 2. The improved device is thus automatic in its action and the feeding trough will be constantly and uniformly supplied so long as any water remains in the tank, and constituting an automatically operating siphon structure.

Having thus described the invention, what is claimed is:

1. In a device of the class described, a reservoir for a liquid and a receptacle with a conduit providing communication between the reservoir and receptacle and a contracted vertical passage communicating with the reservoir and constantly below the level of the liquid in the same, and a member having an orifice communicating with the open air and with the passage and operative to control the position of the lower end of the orifice relative to the passage.

2. In a device of the class described, a reservoir for a liquid and a receptacle with a conduit providing communication between the reservoir and receptacle and a contracted vertical passage communicating with the reservoir and constantly below the level of the liquid in the same and with a vertical opening communicating with the passage, and a member having an orifice communicating with the open air and with the passage and operative in said opening to control the position of the lower end of the orifice relative to the passage.

3. In a device of the class described, a reservoir for a liquid, and a receptacle with a conduit providing communication between the reservoir and the receptacle and with a contracted passage communicating with the reservoir and constantly below the level of the liquid in the same, an orifice being arranged to provide communication between the open air and the passage.

4. In a device of the class described, a reservoir for a liquid and a receptacle with a conduit providing communication between the reservoir and the receptacle and with a contracted passage communicating with the reservoir and constantly below the level of the liquid in the same, a member having an orifice communicating with the open air and with the passage, and means for adjusting said member to control the position of the orifice relative to the passage.

5. In a device of the class described, a reservoir for a liquid and a receptacle with a conduit providing communication between the reservoir and the receptacle and with a contracted passage communicating with the reservoir and constantly below the level of the liquid in the same, a member having an orifice communicating with the open air and with the passage, means for adjusting said member to control the position of the orifice relative to the passage, and a cut off for controlling the flow through the conduit.

In testimony whereof I affix my signature in presence of two witnesses.

ALLAN SMITH. [L. S.]

Witnesses:
FRANK FARRELL,
HELEN P. FIELD.

Copies of this patent may be obtained for five cents each, by addressing the "Commissioner of Patents, Washington, D. C."